(No Model.)
L. H. BANNISTER.
CASKET HANDLE.
No. 527,191.
Patented Oct. 9, 1894.
Fig. 1.
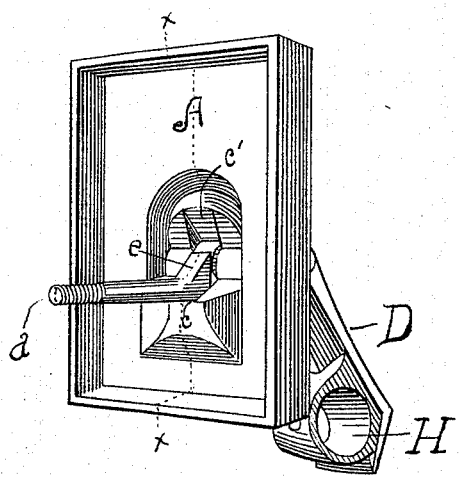
Fig. 2.
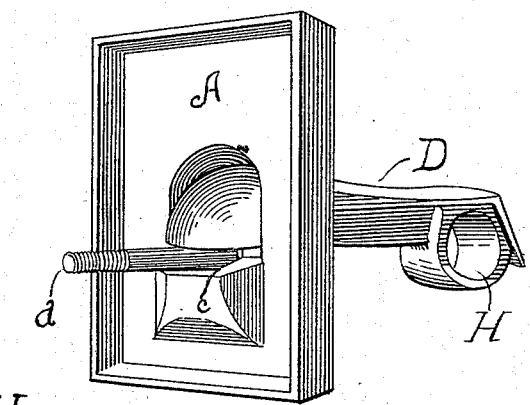
Fig. 3.
Fig. 4.
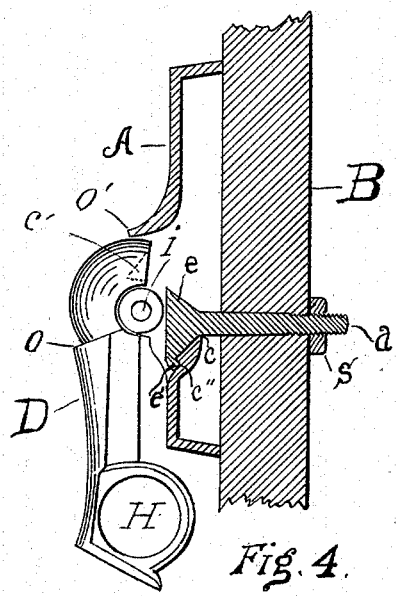
Fig. 5.
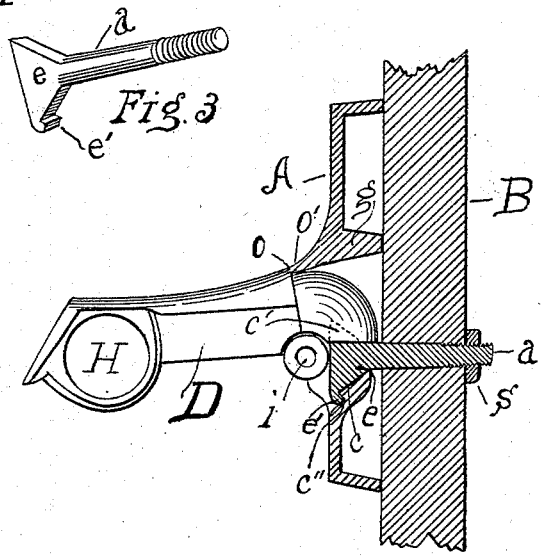
Witnesses.
G. A. Swendfiger
A. W. Bannister
Inventor.
Louis H. Bannister

UNITED STATES PATENT OFFICE.

LOUIS H. BANNISTER, OF PASADENA, CALIFORNIA.

CASKET-HANDLE.

SPECIFICATION forming part of Letters Patent No. 527,191, dated October 9, 1894.

Application filed August 8, 1894. Serial No. 519,765. (No model.)

*To all whom it may concern:*

Be it known that I, LOUIS H. BANNISTER, a citizen of the United States, and a resident of Pasadena, county of Los Angeles, and State of California, have invented new and useful Improvements in Casket-Handles; and I do hereby declare that the following is a full, clear, and exact description of the same, reference being had to the drawings accompanying this specification.

My invention relates to improvements in jointed handles, in which the arm is pivoted to the lug or ear.

One object of my invention is to furnish a greater security.

A further object is to furnish a handle which may be more readily attached, and in which the means of attachment is invisible when the handle is in place upon the casket.

My invention consists in the following construction and arrangement:

In the drawings, Figure 1 is a perspective rear view with the bolt or stud in place, and the arm partially elevated. Fig. 2 is a perspective rear view, with the arm elevated and bearing upon the bolthead. Fig. 3 illustrates the bolt in perspective. Fig. 4 is a side elevation of the arm, and a midsection of the lug and bolt, attached to a section of the casket. Line $x\ x$, Fig. 1, indicates the line of section. Fig. 5 is the same view as Fig. 4 with the arm elevated, and showing the brace $g$, not shown in the other illustrations.

My invention embraces the combination of the bolt $a$ provided with the flanged head $e$ and hook $e'$; the flanged head and hook resting in recesses in the arm and lug as hereinafter more particularly described.

My invention also comprises other features of construction and combinations of parts hereinafter set forth.

It will be understood by those versed in the art that each handle may be provided with two or more lugs and arms, their connection being made by a tube or rod passing through the core H.

The bolt provided with the flanged head $e$ and hook $e'$ engaging in recesses in the lug A and arm D, said bolt passing through an aperture in the wall of the casket, and provided with the nut $s$ form the fastening device.

The hook $e'$ resting in the recess $c''$ is for a temporary fastening, and in this only sufficient strength is necessary to hold the handle securely in place when not in use. When the arm is raised, the upward strain upon the arm D causes the arm and lug to clamp the bolthead $e$, as plainly shown in Figs. 2 and 5.

In Fig. 1 the recess $c'$ is plainly shown. The object of this recess is to bring the upper flange of the bolthead $e$ substantially parallel with the shoulder $o'$. Thus when the arm is raised and the shoulder $o$ bears upon the shoulder $o'$, and the bolthead simultaneously resting in the recess $c'$, the strain will mostly bear upon the brace $g$, as shown in Fig. 5.

To attach the device, lay the handle in place with the arm raised. then mark the wall of the casket through the recess under the arm, after which the handle is removed and an aperture is made, then place the bolt in the recess as shown in Fig. 1, and raise the arm as in Fig. 2. The bolt is then put through the aperture and securely held by the nut $s$.

Some of the features of construction shown are to be found in Patent No. 520,016, issued to me May 15, 1894. Hence I do not herein make claim to such features broadly, which consist in the combination with the arm pivoted to the lug, and arranged to clamp the stud when the same is in the recess and the handle is elevated.

Now, having described my invention, what I claim as new, and desire to secure by Letters Patent, is—

1. In a casket handle as set forth, the combination of the bolt having its head provided with a hook arranged to enter the recess $c''$, and provided with the nut $s$ all for the purpose herein specified.

2. In a casket handle such as described, the combination of the bolt having a flanged head provided with the hook arranged to enter the recess $c''$, and the arm provided with a recess to allow the upper flange of the bolthead to enter therein when the handle is in place and the arm is elevated.

3. In a casket handle, the combination with the lug and arm provided respectively with recesses engaging the bolthead; the arm having the shoulder $o$ bearing upon the shoulder and brace $o'$ $g$, and the bolt provided with the nut $s$ all substantially as described and for the purpose herein specified.

LOUIS H. BANNISTER.

Witnesses:
G. A. SWERDFIGER,
A. W. BANNISTER.